United States Patent
Veiga et al.

(10) Patent No.: US 6,734,123 B2
(45) Date of Patent: *May 11, 2004

(54) POLYURETHANE COATED FABRICS FOR USE IN AIR-HOLDING VEHICLE RESTRAINT SYSTEMS

(75) Inventors: Manuel J. Veiga, Tewksbury, MA (US); Richard J. Satin, Swampscott, MA (US); Philip R. Rampolla, Hollis, NH (US); Leo Lizotte, Nashua, NH (US); Ryan Jennings, Bellingham, MA (US)

(73) Assignee: Bradford Industries, Inc., Lowell, MA (US)

( * ) Notice: Subject to any disclaimer, the term of this patent is extended or adjusted under 35 U.S.C. 154(b) by 162 days.

This patent is subject to a terminal disclaimer.

(21) Appl. No.: 09/956,639

(22) Filed: Sep. 19, 2001

(65) Prior Publication Data

US 2002/0022420 A1 Feb. 21, 2002

Related U.S. Application Data

(63) Continuation of application No. 09/327,244, filed on Jun. 7, 1999, now abandoned.

(51) Int. Cl.⁷ ............................................ B32B 27/02
(52) U.S. Cl. ................ 442/149; 3/383; 280/728.1; 280/729; 280/733; 428/34.3; 428/34.5; 428/34.6; 428/34.7; 428/35.2; 428/36.1; 428/57; 428/55; 428/162; 428/163; 428/166; 442/67; 442/71; 442/76; 442/157; 442/164; 442/172; 442/181; 442/218; 442/286; 442/304; 442/327

(58) Field of Search ................ 3/383; 428/34.3, 428/34.5, 34.6, 34.7, 35.2, 36.1, 57, 55, 162, 163, 166; 280/728.1, 729, 733; 442/67, 71, 76, 149, 157, 164, 172, 218, 181, 286, 304, 327

(56) References Cited

U.S. PATENT DOCUMENTS

| | | |
|---|---|---|
| 3,970,328 A | 7/1976 | Wallsten |
| 4,143,197 A | 3/1979 | Jasionowicz et al. |

(List continued on next page.)

FOREIGN PATENT DOCUMENTS

| | | |
|---|---|---|
| WO | WO 00/78578 A1 | 12/2000 |

OTHER PUBLICATIONS

Publication of Clark–Schwebel Joint Ventures. C–S Integlas A.G., title page, Clark–Schwebel description page, contents, disclaimer page.

Parameters for Woven Fabric Selection (2 pages).

*Primary Examiner*—Arti R. Singh
(74) *Attorney, Agent, or Firm*—Hollander Law Firm, P.L.C.

(57) ABSTRACT

The invention is directed to applying a plurality of polyurethane coating layers to a knit, woven or non-woven fabric substrate, following by sealing of two of such coated substrates together by radio frequency sealing, hot air sealing, or ultrasonic sealing to form an improved air-holding restraint system, such as an air curtain or air bag with superior air-holding characteristics.

32 Claims, 1 Drawing Sheet

U.S. PATENT DOCUMENTS

| | | |
|---|---|---|
| 4,284,682 A | 8/1981 | Frosch et al. |
| 4,560,611 A | 12/1985 | Naka et al. |
| 5,110,666 A | 5/1992 | Menzel et al. |
| 5,178,938 A | 1/1993 | Magistro et al. |
| 5,226,671 A | 7/1993 | Hill |
| 5,240,765 A | 8/1993 | Takahashi et al. |
| 5,254,621 A | 10/1993 | Inoue et al. |
| 5,258,211 A | 11/1993 | Momii et al. |
| 5,298,317 A | 3/1994 | Takahashi et al. |
| 5,316,336 A | 5/1994 | Taguchi et al. |
| 5,399,402 A | 3/1995 | Inoue et al. |
| 5,514,431 A | 5/1996 | Shimomura |
| 5,529,837 A | 6/1996 | Fujiki et al. |
| 5,630,620 A | 5/1997 | Hirai et al. |
| 5,632,057 A | 5/1997 | Lyden |
| 5,647,079 A | 7/1997 | Hakamiun et al. |
| 5,650,207 A | 7/1997 | Crouch |
| 5,651,395 A | 7/1997 | Graham et al. |
| 5,704,402 A | 1/1998 | Bowen et al. |
| 5,707,711 A | 1/1998 | Kitamura |
| 5,721,046 A | 2/1998 | Shrewsburg et al. |
| 5,845,935 A | 12/1998 | Enders et al. |
| 5,863,644 A | 1/1999 | Bönigk et al. |
| 5,881,776 A | 3/1999 | Beasley, Jr. |
| 5,906,391 A | 5/1999 | Weir et al. |
| 5,921,287 A | 7/1999 | Bowen et al. |
| 6,037,279 A | 3/2000 | Brookman et al. |
| 6,042,141 A | 3/2000 | Welch et al. |
| 6,056,316 A | 5/2000 | Yamaji et al. |
| 6,073,961 A | 6/2000 | Bailey et al. |
| 6,113,141 A | 9/2000 | Baker |
| 6,149,194 A | 11/2000 | Breed et al. |
| 6,152,481 A | 11/2000 | Webber et al. |
| 6,168,191 B1 | 1/2001 | Webber et al. |
| 6,169,043 B1 | 1/2001 | Li |
| 6,176,515 B1 | 1/2001 | Wallner et al. |
| 6,177,365 B1 | 1/2001 | Li |
| 6,177,366 B1 | 1/2001 | Li |
| 6,199,898 B1 | 3/2001 | Masuda et al. |
| 6,200,915 B1 | 3/2001 | Adams et al. |
| 6,220,309 B1 | 4/2001 | Sollars, Jr. |
| 6,239,046 B1 | 5/2001 | Veiga et al. |
| 6,250,668 B1 | 6/2001 | Breed et al. |
| 6,270,113 B1 | 8/2001 | Wipasuramonton et al. |
| 6,294,487 B1 | 9/2001 | Keshavaraj |
| 6,344,251 B1 | 2/2002 | Keshavaraj et al. |
| 6,348,543 B1 | 2/2002 | Parker |
| 6,350,709 B1 | 2/2002 | Veiga |
| 6,364,356 B1 | 4/2002 | Keshavaraj |
| 6,429,155 B1 | 8/2002 | Li et al. |
| 6,455,449 B1 | 9/2002 | Veiga et al. |
| 6,458,724 B1 | 10/2002 | Veiga et al. |
| 2001/0005660 A1 | 6/2001 | Li et al. |
| 2001/0009829 A1 | 7/2001 | Sollars, Jr. et al. |
| 2001/0042980 A1 | 11/2001 | Sollar, Jr. |
| 2001/0049243 A1 | 12/2001 | Crouch et al. |

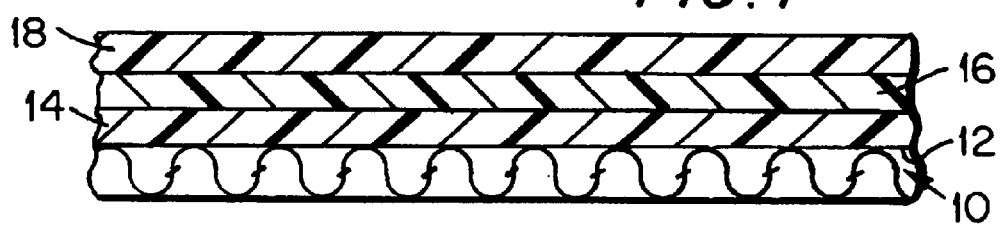
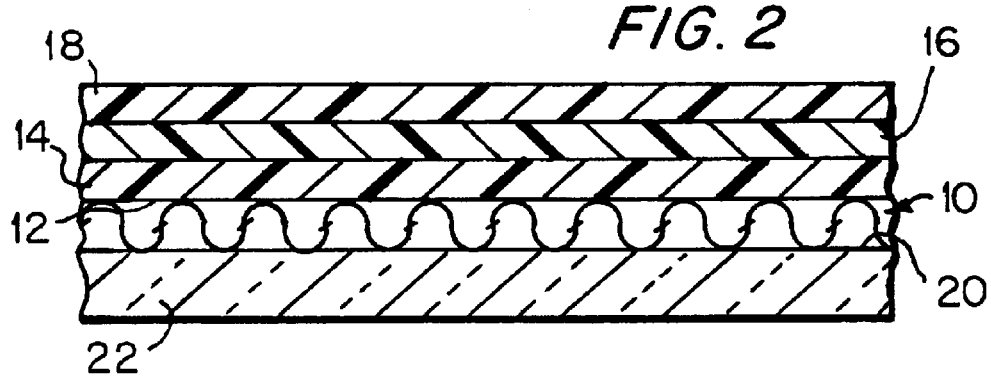

POLYURETHANE COATED FABRICS FOR USE IN AIR-HOLDING VEHICLE RESTRAINT SYSTEMS

CROSS-REFERENCE TO RELATED APPLICATIONS

This application is a continuation of application Ser. No. 09/327,244, filed Jun. 7, 1999, now abandoned, the disclosure of which is incorporated herein by reference and made a part of this application.

FIELD OF THE INVENTION

This invention relates to a coated textile fabric for use in an air-holding vehicle occupant restraint system and, more particularly, to a fabric having a plurality of polymeric layers coated thereon for use in such a vehicle occupant restraint system and the method of coating said textile fabric.

BACKGROUND OF THE INVENTION

The current restraint systems for vehicles include driver side air bags which are housed in the steering wheel in a collapsed, folded condition adapted to be deployed instantaneously in an inflated condition by injection of a gas upon the occurrence of a collision. The advent of such driver-side air bags has resulted in a significant decrease in auto fatalities.

Air bag restraint systems have also been located in the dashboard in order to provide a comparable measure of protection to the passenger seated adjacent the driver.

The automotive industry has recently introduced air bags which are housed in the backs of the front seats or in the rear seats to protect the cabin occupants in the event of a collision occurring on either side of the vehicle.

A still further safety feature which is being marketed for passenger vehicles, especially sport utility vehicles (SUV), are air-holding curtains designed to provide a cushioning effect in the event of roll-over accidents. These curtains are housed in the roof of the vehicle and deploy along the interior sidewalls of the SUV's cabin in the event of a rollover.

One means of improving the efficacy of air-holding in vehicle restraint systems has addressed the coatings to be applied to the textile substrate to improve air retention.

In the prior art, coated air bags were made by coating a nylon substrate with silicone rubber and chloroprene. They were not, however, susceptible to heat sealing. In order to ameliorate the problems inherent in chloroprene and silicone rubber coatings, it has been disclosed in the art, for example, Menzel et al., U.S. Pat. No. 5,110,666, to coat a woven nylon substrate with polyurethane to provide the desired permeability to better retain the inflation gas.

Despite the advances in air bag coating technology, the problems of controlling air permeability, air pressure, and volume still remain. Another problem resulting in air loss stems from the fact that during the manufacture of the air bags, they are stitched shut by means of sewing. Inherently, each stitch creates a potential leak which adversely affects the integrity and, hence, the air holding capability of the bag, especially when instantaneous deployment of an operative airbag is required.

SUMMARY OF THE INVENTION

It has now been found that by applying a plurality of polyurethane coating layers to a knit, woven or non-woven fabric substrate followed by sealing of the layers together by either radio frequency sealing, hot air sealing, or ultrasonic sealing, an air-holding restraint system is obtained which has superior air holding characteristics, viz., permeability, and volume and pressure retention.

BRIEF DESCRIPTION OF THE DRAWINGS

FIG. 1 is a cross-sectional view of a textile substrate having a plurality of polyurethane coating layers on one surface in accordance with the present invention.

FIG. 2 is a cross-sectional view of a textile substrate having a plurality of polyurethane coating layers on one surface in accordance with the embodiment of FIG. 1 and a polysiloxane coating on the opposite or reverse surface.

In describing the figures, similar parts in the various embodiments will be referred to by the same numerals.

DETAILED DESCRIPTION OF THE INVENTION

It has been found that when a surface of a textile substrate having opposed surfaces is initially coated with an adhesive polyurethane layer and, thereafter, with an elastomeric polyurethane layer, and, ultimately, a non-sticking, polyurethane top coat; the coated substrate when converted into an air-holding restraint system by joining two (2) such coated substrates together by heat sealing, yields a restraint system having improved air retention.

Either natural or synthetic fibers can be employed as the textile fabric substrate, with polyamide or polyester fibers being preferred, and it can be in the form of either a knit, woven, or a non-woven fabric. Employing a woven nylon as the fabric, substrate is especially preferred. Any type of denier size, shape and weaving configuration can be employed to advantage. The shape or configuration to be employed in the air holding restraint system will depend upon its ultimate location in the vehicle. For example, driver or passenger air bags will generally be elliptical, spherical or circular, while air curtains will generally be rectangular or oval in configuration.

The coating of the fabric substrate with layers of polyurethane takes place on a coating line that has multiple coating stations with driers in sequence. Initially, prior to applying the first polyurethane coating layer, the fabric substrate is heat-set and stabilized by passing through an oven at an elevated temperature of from about 250° to about 400° F. Thereafter, it is coated in accordance with the present invention.

In one embodiment of the present invention, as can be seen by reference to FIG. 1, a fabric substrate 10, is first coated on its upper or top surface 12 with a polyurethane layer 14, which is referred to as a prime coat or adhesive coat, which serves to adhesively bond the filaments of the textile substrate so they do not comb or unravel. The polyurethane used in the prime coat or first layer 14 can be selected from among aromatic or aliphatic polyether or polyester polyurethanes and, preferably those having a solids content of from about 30% to about 60%, by weight. These types of polyurethanes provide good adhesion to nylon and satisfactory hydrolysis, i.e., resistance to breakdown under ambient storage conditions, to insure that the air bag or air curtain is ready for use when deployed.

Preferably, the prime coat layer 14 completely covers the entire surface 12 of the fabric 10. Alternatively, it can be applied as a partial coating designed to coincide with a particular area of the fabric. Also, particular patterns, such as stripes, wavy lines, etc., with different coating weights can be employed to obtain the level of air permeability desired.

The prime coat layer is then dried in an oven at about 225° F. to about 450° F. range for about 1.5 minutes to about 3.0 minutes while advancing the fabric at a speed of about 1,000 yards per hour to about 3,000 yards per hour, with 1,200 yars/hr. being preferred. The prime coat polyurethane layer and the nylon form to crosslink a polymer chain.

At a second coating station, a second layer 16 of polyurethane, also referred to as the elastomeric layer, is deposited and coated onto the first layer 14. The elastomeric layer 16 is from about 30% to about 100% solids by weight, of an aromatic or aliphatic polyether or polyester polyurethane. Optionally, depending on the chemical and physical properties sought to be introduced into the airbag, there is added to the elastomer, for example, flameproofing agents, such as aluminium trihydrate or antimony trioxide, mildew prevention agents, such as BP5® by Morton Thiokol and UV and ozone resistance agents, e.g., TINUVUN 765® by Ciba Geigy. The elastomeric layer 16 reacts with and chain extends with the prime coat layer 14 to establish a homogeneous composite. The coating weight is within the range of about 1 ounce/square yard to about 8 ounces/square yard, with about 2 ounces/sq. yard being preferred. It is then dried in an oven maintained at an elevated temperature from about 350° F. to about 450° F.

Thereafter, a third layer or topcoat 18 of an aliphatic or aromatic polyether or polyester polyurethane is coated onto the second polyurethane layer 16. This top coat layer 18 is designed to prevent blocking or self-sticking of the air bag layers to each other in its collapsed, folded condition and upon deployment. The coating weight is from about 0.2 to about 2.0 ounces per square yard with a coating weight of about 0.5 ounces/sq. yard preferred. This layer is heated at an elevated temperature, at about 250° to about 400° F. for 1.5 to 3.0 minutes in an oven, and it crosslinks with the second coating layer.

The laminated or composite structure depicted in FIG. 1 typically forms a panel of an air bag or an air curtain after die cutting into the desired configuration by the air bag manufacturer. A complementary composite structure, similar in all respects to the structure of FIG. 1, forms the opposite panel of the airbag or air curtain. In accordance with the present invention, the two (2) panels are sealed together about their peripheries by sealing the polyurethane layers together, by radio frequency (RF) sealing, hot air sealing or ultrasonic sealing at from about 10 to about 80 megahertz and at about 250° F. to about 450° F., with radio frequency sealing being preferred. Sealing in this manner serves to better control the air permeability of the bag while maintaining its integrity against air leakage, since conventional closing by stitching or sewing with its attendant inherent leakage problems are avoided. Employing a polyurethane-radio frequency sealing system is especially important in the manufacture of air-filled tubular curtains since air must be held in the tubular structures comprising the curtain for longer periods of time than with a conventional airbag. Such curtains must open within 2 to 3 milliseconds and must stay inflated for about 3 to about 12 seconds after deployment in the event of multiple rollovers, say, three (3) such rollovers in a single incident.

In another embodiment of the present invention, as depicted in FIG. 2, the upper or outer surface 12 of fabric 10 is coated with the same coating layers as depicted in FIG. 1. However, in this embodiment, the bottom or inner surface 20 of fabric substrate 10 has a layer of a polysiloxane 22 coated thereto. It is then dried in an oven at a temperature of about 275° F. to about 450° F. and vulcanizes with the textile substrate. The polysiloxane is preferably a silicone rubber elastomer. The coating weight of the polysiloxane layer 22 on the inner surface 20 is from about 0.5 ounces per square yard to about 5.0 ounces per square yard, with 1.2 ounces per square yard preferred. The silicone coating provides added protection to the fabric to protect against the high temperatures encountered during inflation with hot gases.

What is claimed is:

1. A coated textile substrate for an air-holding vehicle restraint system, which comprises:
   a) a textile substrate having opposed surfaces;
   b) a first coating layer of an adhesive polyurethane on a surface of said textile substrate;
   c) a second coating layer of an elastomeric polyurethane on said first coating layer; and
   d) a third coating layer of elastomeric polyurethane on said second coating layer.

2. The coated textile substrate of claim 1 wherein said textile substrate is a fabric constructed from synthetic fibers.

3. The coated textile substrate of claim 2 wherein the synthetic fibers are selected from the group consisting of polyamides and polyesters.

4. The coated textile substrate of claim 1 wherein said textile substrate is a knitted, woven or non-woven fabric.

5. The coated textile substrate of claim 1 wherein the textile substrate is a woven nylon.

6. The coated textile substrate of claim 1 wherein the first coating layer is selected from the group consisting of aromatic or aliphatic polyester or polyether polyurethanes.

7. The coated textile substrate of claim 1 wherein the first coating layer has a coating weight of from about 0.3 ounces/sq. yd to about 1.5 ounces/sq. yd.

8. The coated textile substrate of claim 7 wherein the coating weight is about 0.5 ounces/sq. yd.

9. The coated textile substrate of claim 1 wherein the second coating layer is an elastomeric aliphatic or aromatic polyether or polyester polyurethane having a solids content of from about 30% to about 100%, by weight.

10. The coated textile substrate of claim 1 wherein the second coating layer has a coating weight of about 1 ounce/sq. yd. to about 8 ounces/sq. yd.

11. The coated textile substrate of claim 10 wherein the second coating layer has a coating weight of about 2 ounces/sq. yd.

12. The coated textile substrate of claim 1 wherein the third coating layer is an elastomeric aromatic or aliphatic polyether or polyester polyurethane having a coating weight of from about 0.2 ounces/sq. yd. to about 2.0 ounces/sq. yd.

13. The coated textile substrate of claim 1 wherein the other surface of said textile substrate is coated with an adhesive polyurethane.

14. The coated textile substrate of claim 1 wherein the other surface of said textile substrate is coated with a polysiloxane.

15. An air-holding vehicle restraint system, comprising:
   a pair of heat-sealed polyurethane coated textile substrates;
   the outer surface of each substrate having an adhesive polyurethane layer thereon and overlying elastomeric polyurethane layers.

16. The restraint system of claim 15 wherein the heat sealed textile substrates form an air-tight connection.

17. The restraint system of claim 15 wherein the textile substrates are heat-sealed about their peripheries.

18. The restraint system of claim 15 wherein the textile substrates are sealed by radio frequency sealing, hot air sealing or ultrasonic sealing.

19. The restraint system of claim 18 wherein the substrates are sealed by radio frequency sealing at from about 10 to about 80 megahertz.

20. The restraint system of claim 15 wherein the air-holding restraint system is an air bag.

21. The restraint system of claim 15 wherein the air-holding restraint system is an air curtain.

22. The restraint system of claim 15 wherein the textile substrates are selected from the group consisting of polyesters, polyamides or other synthetic fibers.

23. The restraint system of claim 15 wherein the textile substrates are woven nylon.

24. The restraint system of claim 15 wherein the adhesive polyurethane coating layer is selected from the group consisting of aliphatic or aromatic polyester or polyether polyurethanes.

25. The restraint system of claim 15 wherein the adhesive coating layer has a coating weight of from about 0.3 ounces per sq. yd to about 1.5 ounces per sq. yd.

26. The restraint system of claim 25 wherein the coating weight is about 0.5 ounces per sq. yd.

27. The restraint system of claim 15 wherein the first overlying coating layer is an elastomeric aliphatic or aromatic polyether or polyester polyurethane having a solids content of from about 30% to about 100%, by weight.

28. The restraint system of claim 15 wherein the first overlying coating layer has a coating weight of from about 1 ounce per sq. yd. to about 8 ounces per sq. yd.

29. The restraint system of claim 28 wherein the coating weight is about 2 ounces per sq. yd.

30. The restraint system of claim 15 wherein the second overlying coating layer is an elastomeric aromatic or aliphatic polyester or polyether polyurethane having a coating weight of from about 0.2 ounces per sq. yd. to about 2.0 ounces per sq. yd.

31. The restraint system of claim 15 wherein the inner surface of each of said textile substrates is coated with an adhesive polyurethane.

32. The restraint system of claim 15 wherein the inner surface of each of said textile substrates is coated with a polysiloxane.

* * * * *